(12) United States Patent
Yamada

(10) Patent No.: US 8,441,652 B2
(45) Date of Patent: May 14, 2013

(54) PROFILE MEASURING APPARATUS, METHOD FOR MEASURING PROFILE, AND METHOD FOR MANUFACTURING PRODUCT

(75) Inventor: Tomoaki Yamada, Kanagawa (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 13/304,658

(22) Filed: Nov. 27, 2011

(65) Prior Publication Data
US 2012/0069353 A1 Mar. 22, 2012

Related U.S. Application Data

(63) Continuation of application No. PCT/JP2010/058958, filed on May 27, 2010.

(30) Foreign Application Priority Data

May 27, 2009 (JP) ................... 2009-127210

(51) Int. Cl.
*G01B 11/24* (2006.01)
(52) U.S. Cl.
USPC ........................................ 356/609
(58) Field of Classification Search .......... None
See application file for complete search history.

(56) References Cited

U.S. PATENT DOCUMENTS

| | | | | |
|---|---|---|---|---|
| 6,172,373 B1 * | 1/2001 | Hara et al. | ..................... | 356/401 |
| 2009/0021708 A1 * | 1/2009 | Boxmeer et al. | ............... | 356/624 |
| 2009/0208855 A1 * | 8/2009 | Koga | ............................. | 356/401 |

FOREIGN PATENT DOCUMENTS

| | | |
|---|---|---|
| JP | 58-97503 | 7/1983 |
| JP | 61-260113 | 11/1986 |
| JP | 6-201337 | 7/1994 |
| JP | 8-14865 | 1/1996 |
| JP | 8-313230 | 11/1996 |
| JP | 3321866 | 6/2002 |
| JP | 2003-148939 | 5/2003 |
| JP | 2008-89535 | 4/2008 |

OTHER PUBLICATIONS

English language International Search Report for International Application PCT/JP2010/058958, mailed Aug. 3, 2010 (PCT/ISA/210) (2 pages in Japanese language) (2 pages in English).
Japanese language PCT Written Opinion of International Application PCT/JP2010/058958, mailed Aug. 3, 2010 (PCT/ISA/237) (4 pages).

* cited by examiner

*Primary Examiner* — Gregory J Toatley
*Assistant Examiner* — Juan D Valentin, II

(57) ABSTRACT

There is provided a profile measuring apparatus which measures a profile of an object, including an imaging element; an image formation optical system including an objective lens; a measuring direction changing unit which is configured to change inclination of a surface of the object with respect to the objective lens based on information of the inclination of the surface of the object so that a light flux enters the objective lens with an aperture angle not less than a predetermined degree; and a measuring unit which is configured to measure the profile of the object based on the image, of the object on which the pattern is projected, obtained by the imaging element.

13 Claims, 12 Drawing Sheets

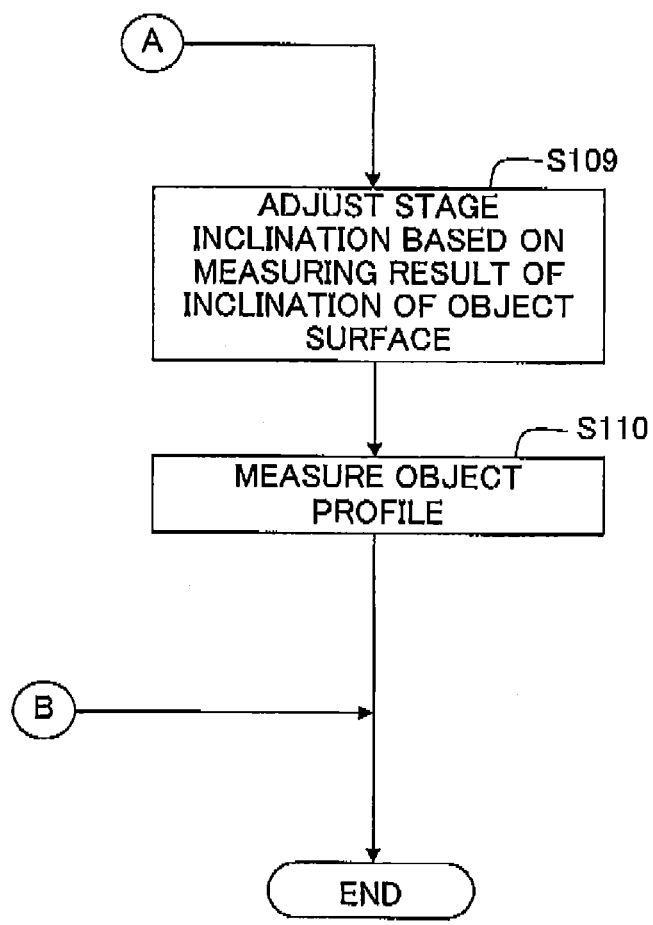

PROFILE MEASURING APPARATUS, METHOD FOR MEASURING PROFILE, AND METHOD FOR MANUFACTURING PRODUCT

CROSS-REFERENCE TO RELATED APPLICATIONS

This is a Continuation Application of International Application No. PCT/JP2010/058958 filed on May 27, 2010 which claims priority to Japanese patent Application No. 2009-127210 filed on May 27, 2009. The contents of the aforementioned applications are incorporated herein by reference in their entirety.

BACKGROUND

1. Field of the Invention

The present teaching relates to a profile measuring apparatus, a method for measuring a profile of an object, and a method for manufacturing a product. In particular, the present teaching relates to a profile measuring apparatus, a profile measuring method and a manufacturing method, which are configured to improve measurement precision.

2. Description of the Related Art

Conventionally, profile measuring apparatuses have been known for measuring the profile of an object by the shape from focus method (for example, see Japanese Patent No. 3321866). In a profile measuring apparatus utilizing the shape from focus method, for example, a projection optical system projects an image of a predetermined pattern on the object, and an optical imaging system takes an image of the object on which the pattern image is projected (to be referred to as an observational image hereinafter) while moving the object in an optical-axis direction of the optical imaging system. Then, the profile of the object is measured by calculating degree of focus (focus measure) of each pixel of a plurality of obtained observational images, and detecting the focus position of the pattern image based on the calculated degree of focus. Further, the degree of focus is a value denoting a state of focalization of the pattern image (at the focal point).

In the profile measuring apparatus utilizing the shape from focus method, the precision of the measurement becomes higher when the NA (numerical aperture) of the optical imaging system is larger, and when the focal depth of the optical imaging system is shallower.

FIG. 10 is a graph showing changes in the degree of focus of a certain pixel of observational images taken by optical imaging systems with different NA while moving the object in an optical-axis direction of the optical imaging systems. Further, the horizontal axis of FIG. 10 represents the position of the object in the optical-axis direction of the optical imaging systems, whereas the vertical axis represents the degree of focus. Further, the curve 501 shows a change in the degree of focus when utilizing the optical imaging system with a large NA, whereas curve 502 shows a change in the degree of focus when utilizing the optical imaging system with a small NA. As shown in this graph, because a large NA of the optical imaging system produces a rapider change in the degree of focus, the accuracy of detecting a focus position is improved. As a result, the precision of measuring the profile of an object is improved.

SUMMARY

According to an aspect of the present teaching, there is provided a profile measuring apparatus which measures a profile of an object, including:

an imaging element which is configured to take an image of the object on which a pattern is projected;

an image formation optical system which is arranged to form an image of the pattern, projected on the object, on the imaging element and which includes an objective lens that condenses a light flux from the object on which the pattern is projected;

a measuring direction changing unit which is configured to change inclination of a surface of the object with respect to the objective lens based on information of the inclination of the surface of the object so that a light flux from a position of the object, reaching the imaging element through the objective lens, enters the objective lens with an aperture angle not less than a predetermined degree; and a measuring unit which is connected to the imaging element and measures the profile of the object based on the image, of the object on which the pattern is projected, obtained by the imaging element.

BRIEF DESCRIPTION OF THE DRAWINGS

FIGS. 8A and 8B are flowcharts for explaining a profile measuring process carried out in the third embodiment of the profile measuring apparatus in accordance with the present teaching;

DESCRIPTION OF THE EMBODIMENTS

Hereinbelow, referring to the accompanying drawings, embodiments of the present teaching will be explained.

Figure 1:
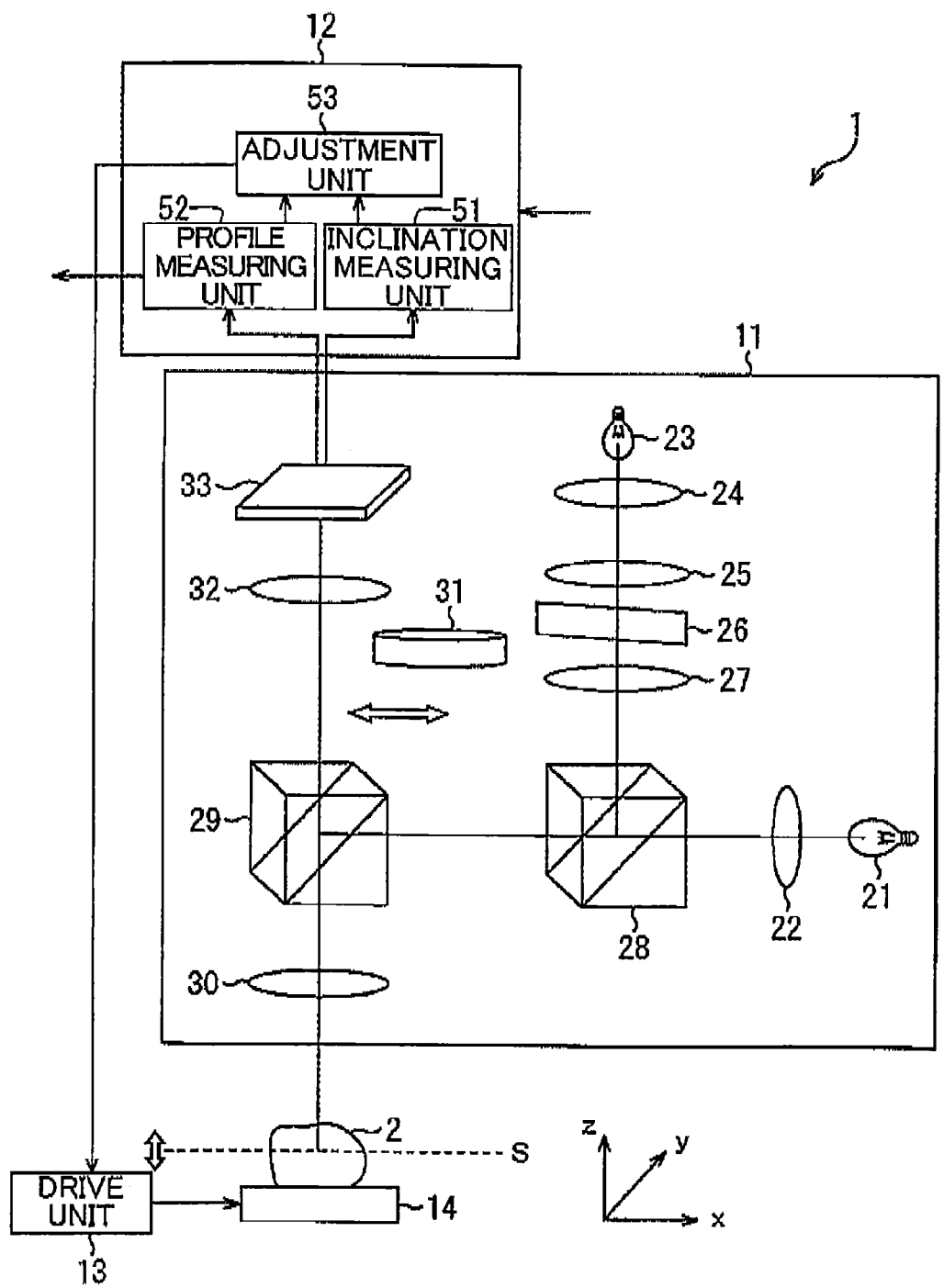
FIG. 1 is a block diagram showing a first embodiment of a profile measuring apparatus in accordance with the present teaching.
Figure 2:
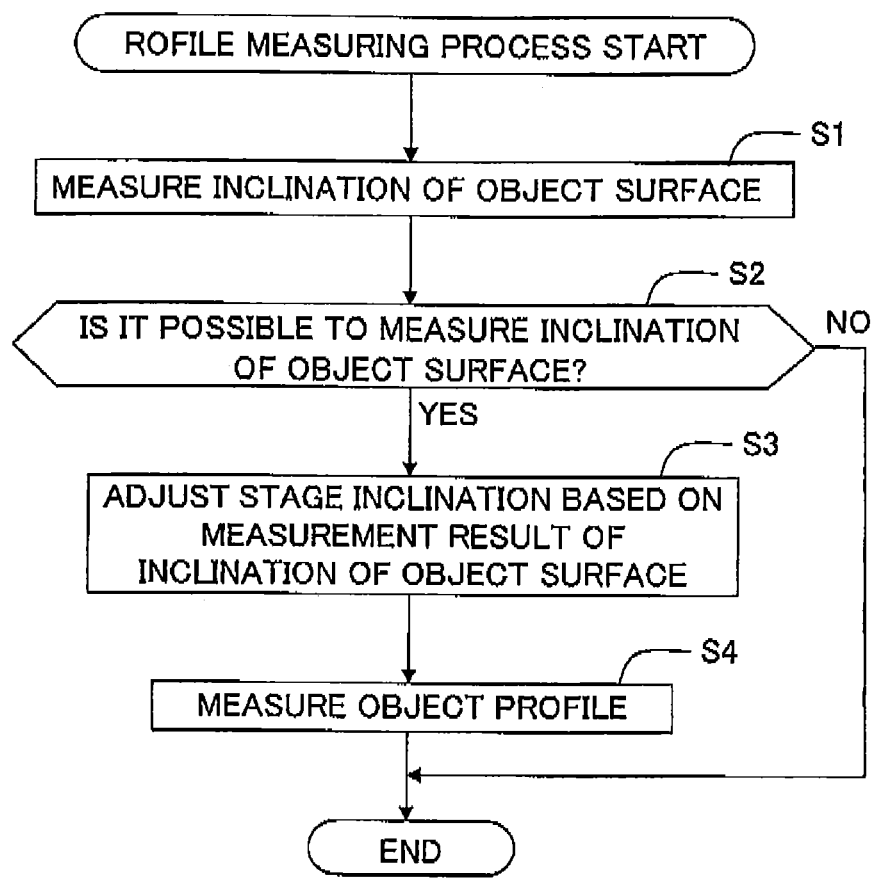
FIG. 2 is a flowchart for explaining a profile measuring process carried out in the first embodiment of the profile measuring apparatus in accordance with the present teaching.

Referring to FIGS. 1 and 2, explanations will be made with respect to a first embodiment of a profile measuring apparatus in accordance the present teaching.

FIG. 1 is a block diagram showing the first embodiment of the profile measuring apparatus in accordance with the present teaching. Further, hereinbelow, the horizontal direction of FIG. 1 will be referred to as an x-axis direction, the vertical direction as a z-axis direction, and the direction perpendicular to the x-axis direction and the z-axis direction as a y-axis direction (perpendicular to the plane of the paper).

A profile measuring apparatus 1 projects a predetermined pattern image onto an object 2 placed on the stage 14 to be measured by means of a measuring section 11, and takes an image of the object 2 on which the pattern image is projected, while moving a stage 14 in the z-axis direction by means of a drive unit 13 including an actuator and the like. Then, the profile measuring apparatus 1 measures a three-dimensional profile of the surface of the object 2 by means of a control section 12 based on an obtained observational image.

Next, referring to the flowchart of FIG. 2, explanations will be made with respect to the details of a profile measuring process carried out by the profile measuring apparatus 1. This process starts, for example, when a user inserts a Bertrand lens 31, which is configured to be able to insert into or remove from the optical path of the measuring section 11, into the optical path between an objective lens 30 and an imaging lens 32, turns on a laser light source 21, turns off a light source 23 and, furthermore, inputs a command to adjust the inclination of the stage 14 to the control section 12 via an operating unit (not shown).

In step S1, the profile measuring apparatus 1 measures the inclination of the object surface. In particular, a parallel laser beam emitted from the laser light source 21 (to be referred to as an adjustment light beam) is transmitted through a collector lens 22 and a half prism 28 and reflected by a half prism 29 toward the direction to the objective lens 30. At the time, the adjustment light beam is condensed or focused due to the collector lens 22 with a predetermined convergence angle on the pupil plane of the objective lens 30 at the light-source side (the back focal plane; the exit pupil plane). Then, the adjustment light beam condensed on the pupil plane of the objective lens 30 at the light-source side enters the objective lens 30, becomes a parallel light beam due to the objective lens 30, and irradiates the object 2 from the same direction as the optical axis of the objective lens 30.

Hereinbelow, an optical system irradiating the object 2 with the adjustment light beam will be referred to as an illumination optical system. In the profile measuring apparatus 1, the illumination optical system includes the laser light source 21, the collector lens 22, the half prism 28, the half prism 29, and the objective lens 30.

The adjustment light beam irradiated onto the object 2 is reflected by the surface of the object 2 (namely the object surface), transmitted through the objective lens 30 and the half prism 29, enters the Bertrand lens 31, and becomes a parallel light beam due to the Bertrand lens 31. Then, the parallel adjustment light beam enters the imaging lens 32 to form an image on the light receiving surface of a CCD sensor 33. That is, the objective lens 30, the Bertrand lens 31, and the imaging lens 32 constitute a pupil image formation optical system. In this manner, the pupil image, at the imaging side of the objective lens 30 (the back focal plane; the exit pupil plane), of the object 2 on which the adjustment light beam is projected is focused on the light receiving surface of the CCD sensor 33 by the Bertrand lens 31 and the imaging lens 32.

The CCD sensor 33 takes an image for the pupil image of the object 2 irradiated by the adjustment light beam (to be referred to as an adjustment image hereinbelow) under the control of an inclination measuring unit 51 of the control section 12, and the CCD sensor 33 provides the obtained adjustment image to the inclination measuring unit 51.

Hereinbelow, an optical system for taking an image of the object 2 will be referred to as an optical imaging system. Therefore, in the profile measuring apparatus 1, the optical imaging system is constructed by the objective lens 30, the half prism 29, the Bertrand lens 31, the imaging lens 32, and the CCD sensor 33. This optical imaging system is provided to exert the property of a telecentric optical system on the side of the object 2.

Here, when the surface of the object 2 to be measured is a mirror plane (a specular plane), then the direction of the reflected adjustment light beam differs with the inclination of the object surface (the normal direction of the object surface). Hence, when the direction of the reflected adjustment light beam differs, the adjustment light beam differs in the position of entering the objective lens 30 and in the position of incidence on the pupil plane of the objective lens 30 at the imaging side (namely the pupil plane of the optical imaging system). As a result, the inclination of the object surface causes a change in position of the bright spots (to be referred to as the laser spots hereinbelow), which are the image of the adjustment light beam in the adjustment image.

The inclination measuring unit 51 detects the barycentric position of the laser spots in the adjustment image. Based on the obtained barycentric position, the inclination measuring unit 51 measures an angle, as the inclination of the object surface, between the normal of the object surface and the optical-axis direction of the objective lens 30 (that is, the optical-axis direction of the optical imaging system; the z-axis direction), the angle being referred to as an inclination angle hereinbelow.

In step S2, based on the processing result of step S1, the inclination measuring unit 51 determines whether or not the inclination of the object surface has been measured successfully. When it is determined that the inclination of the object surface has been measured successfully, then the process proceeds to step S3.

In step S3, the profile measuring apparatus 1 adjusts the inclination of the stage 14 based on the measuring result of the inclination of the object surface. In particular, the inclination measuring unit 51 notifies an adjustment unit 53 of the measuring result of the inclination angle of the object surface. The adjustment unit 53 adjusts the inclination of the stage 14 so that among the light fluxes of the pattern reflected from one point of the measuring center of the object surface, an angle which is defined by the light fluxes reaching the objective lens 30 becomes no less than a certain degree. As described above, when the object surface is a mirror plane, then the light fluxes from one point of the object surface diverges. Then, the convergence angle of the light fluxes at the one point of the object surface at which the light fluxes are converged is maintained as it is. Therefore, the bisectors of the above convergence angle or the bisectors of the divergence angle as from the one point of the object surface toward the objective lens 30 intersects at an angle twice as large as the angle formed between the optical axis of the objective lens 30 and the normal of the object surface. For this reason, with respect to the focal depth determined by the numerical aperture of the objective lens 30, the diameter of the light fluxes entering the objective lens 30 becomes small, and thereby the focal depth changes. Here, the inclination of the surface of the object 2 with respect to the objective lens 30 is changed or adjusted so that among the light fluxes of the pattern reflected from one point of the measuring center on the object surface, the light fluxes reaching the objective lens 30 form such an angle as to render a focal depth substantially equivalent to the focal depth determined by the numerical aperture of the objective lens 30. Most preferably, the adjustment unit 53 controls the drive unit 13 so that the inclination angle of the object surface become zero degree. In other words, the inclination of the stage 14 is adjusted so that the object surface become vertical to the optical axis of the optical imaging system.

More specifically, the stage 14 is configured to be rotatable about the x-axis (with the x-axis as the rotation center), rotatable about the y-axis (with the y-axis as the rotation center), and movable parallely along the z-axis direction. Then, the adjustment unit 53 controls the drive unit 13 to adjust the inclination of the stage 14 by rotating the stage 14 about the x-axis and/or about the y-axis so that the inclination angle of the object surface becomes zero degree.

In step S4, the profile measuring apparatus 1 measures the profile of the object 2. In particular, first, the user removes the Bertrand lens 31 from the optical path of the measuring section 11, turns on the light source 23, turns off the laser light source 21 and, furthermore, inputs a command to measure the profile of the object 2 to the control section 12 via the unshown operating unit.

Then, the light beam emitted from the light source 23 (to be referred to as the measuring light beam hereinbelow) becomes a parallel light beam due to a condenser lens 24. The parallel light beam is condensed due to a relay lens 25 on a plane image-conjugate to a focalization plane S of the measuring light beam irradiating the object 2, and enters a projection pattern plate 26 arranged there.

The projection pattern plate 26 is constructed from such as liquid crystal elements. A predetermined pattern (a sine wave pattern, for example) is formed on the projection pattern plate 26, and the measuring light beam transmitted through the projection pattern plate 26 becomes a pattern light beam having a pattern of the same shape as the pattern on the projection pattern plate 26. Then, the pattern light beam transmitted through the projection pattern plate 26 becomes a parallel light beam due to the relay lens 27, is reflected by the half prism 28 and the half prism 29 in the direction to the objective lens 30, and enters the objective lens 30. The objective lens 30 forms an image of the pattern light beam on the focal plane S, and projects the image of the pattern formed in the projection pattern plate 26 onto the object 2.

An optical system projecting the pattern image onto the object 2 will be referred to as a projection optical system hereinbelow. Therefore, in the profile measuring apparatus 1, the projection optical system is constituted by the light source 23, the condenser lens 24, the relay lens 25, the projection pattern plate 26, the relay lens 27, the half prism 28, the half prism 29, and the objective lens 30.

The pattern light beam irradiated onto the object 2 is reflected by the surface of the object 2, transmitted through the objective lens 30 and the half prism 29, and enters the imaging lens 32. Then, the imaging lens 32 forms a pattern image of the pattern light beam obtained via the object 2 on the light receiving surface of the CCD sensor 33.

The CCD sensor 33 takes an image of the object 2 on which the pattern image is projected (namely an observational image) under the control of a profile measuring unit 52 of the control section 12, and provides the obtained observational image to the profile measuring unit 52.

Following a command from the profile measuring unit 52, the adjustment unit 53 controls the drive unit 13 to move the position of the stage 14 in the z-axis direction. This brings about a change in the relative positional relationship between the focal plane S and the object 2. Then, the CCD sensor 33 takes an observational image of the object 2 for each predetermined position of the focal plane S under the control of the profile measuring unit 52, and provides the taken image to the profile measuring unit 52, The profile measuring unit 52 calculates the degree of focus of each pixel for a plurality of the obtained observational images. As described above, the degree of focus is a value denoting a state of focalization of the pattern image (at the focal point), and a greater value shows a better focalization of the pattern image. Further, the method for calculating the degree of focus is disclosed in, for instance, Japanese Patent Application Laid-Open No. H03-63507 and the like.

Based on the calculated degree of focus, the profile measuring unit 52 detects the focus position at which the pattern image is in focus for each pixel of the observational images. Based on the focus position of each pixel of the observational images, the profile measuring unit 52 generates a point group data denoting a positional relation for each point of the object 2 corresponding to each pixel of the observational images, and outputs the data to an external device.

Then, the profile measuring process is ended.

On the other hand, in step S2, when it is determined that the inclination of the object surface has not been measured successfully, then the profile measuring process is ended without carrying out the measuring of the profile of the object 2. This occurs in such cases as the inclination angle of the object surface is large, whereby the adjustment light beam reflected by the object surface almost does not enter the entrance pupil of the objective lens 30. Thereafter, for example after visually adjusting the inclination of the stage 14, the user may either measure the profile of the object 2 or carry out the process over again from step S1.

As described above, the profile of the object 2 is measured after automatically adjusting the inclination of the stage 14 so that the inclination angle of the object surface becomes zero degree. Therefore, decrease in the substantial NA of the optical imaging system is restrained, and thereby it is possible to readily improve the precision of measuring the profile of the object 2.

Further, the first embodiment may as well be configured in such a manner, for example, as to measure the profile of the object 2 automatically after adjusting the inclination of the stage 14 by enabling the control section 12 to control the operation of inserting and removing the Bertrand lens 31 into and from the optical path, and the operation of turning on and turning off the laser light source 21 and the light source 23.

Further, in order to narrow the range of irradiating the object 2 by the adjustment light beam so as to improve resolution for the inclination angle of the object surface, an aperture stop may be provided such as between the collector lens 22 and the half prism 28 to narrow the width of the adjustment light beam.

Next, referring to FIGS. 3 to 5, explanations will be made with respect to a second embodiment of a profile measuring apparatus in accordance with the present teaching.

Figure 3:
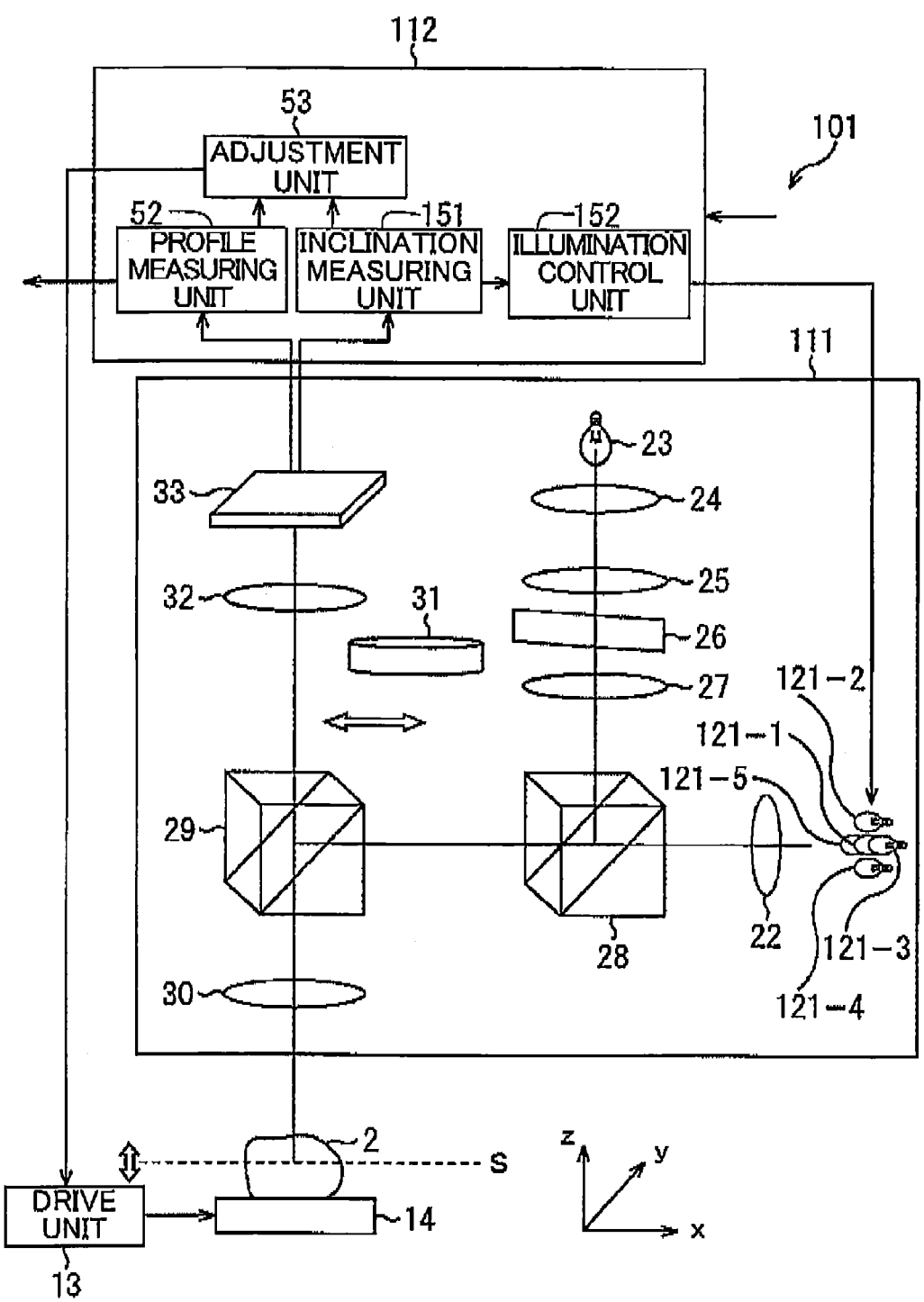
FIG. 3 is a block diagram showing a second embodiment of a profile measuring apparatus in accordance with the present teaching.

FIG. 3 is a block diagram showing the second embodiment of the profile measuring apparatus in accordance with the present teaching. Further, the portions in the figure corresponding to those in FIG. 1 are designated by the same reference numerals.

Compared with the profile measuring apparatus 1 in FIG. 1, a profile measuring apparatus 101 in FIG. 3 is different in that a measuring section 111 is provided instead of the measuring section 11, and a control section 112 is provided instead of the control section 12.

Compared with the measuring section 11 of the profile measuring apparatus 1, the measuring section 111 is different in the number of laser light sources. That is, while the measuring section 11 includes one laser light source 21, the measuring section 111 includes five laser light sources 121-1 to 121-5. Further, when it is unnecessary to distinguish the laser light sources 121-1 to 121-5 individually, they will be collectively referred to as the laser light sources 121 hereinbelow.

Further, compared with the control section 12 of the profile measuring apparatus 1, the control section 112 is different in that an inclination measuring unit 151 is provided instead of the inclination measuring unit 51, and an illumination control unit 152 is additionally provided.

The inclination measuring unit 151 has the same function as the inclination measuring unit 51 of the profile measuring apparatus 1. Further, the inclination measuring unit 151 instructs the illumination control unit 152 to turn on and turn off each laser light source 121.

The illumination control unit 152 controls the operations of turning on and turning off each laser light source 121 in accordance with the instructions from the inclination measuring unit 151.

Figure 4:
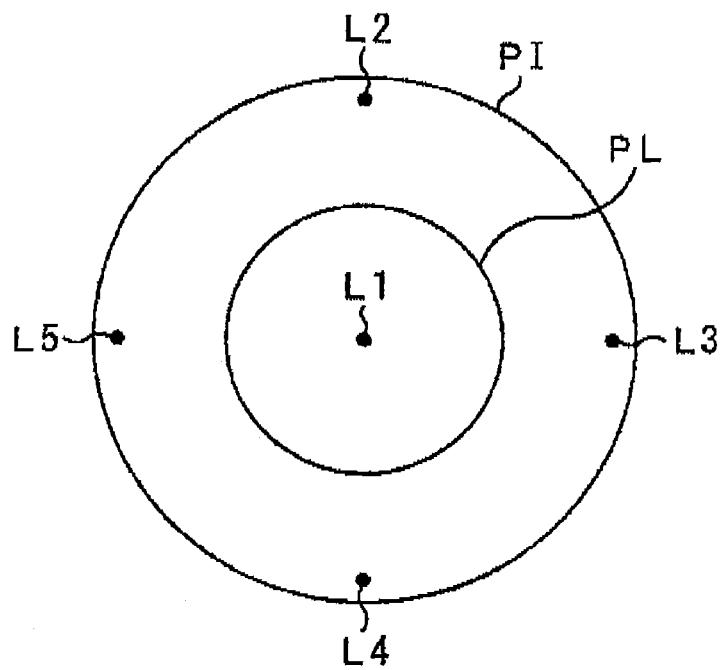
FIG. 4 is a diagram for explaining irradiation positions of an adjustment light beam.
Figure 5:
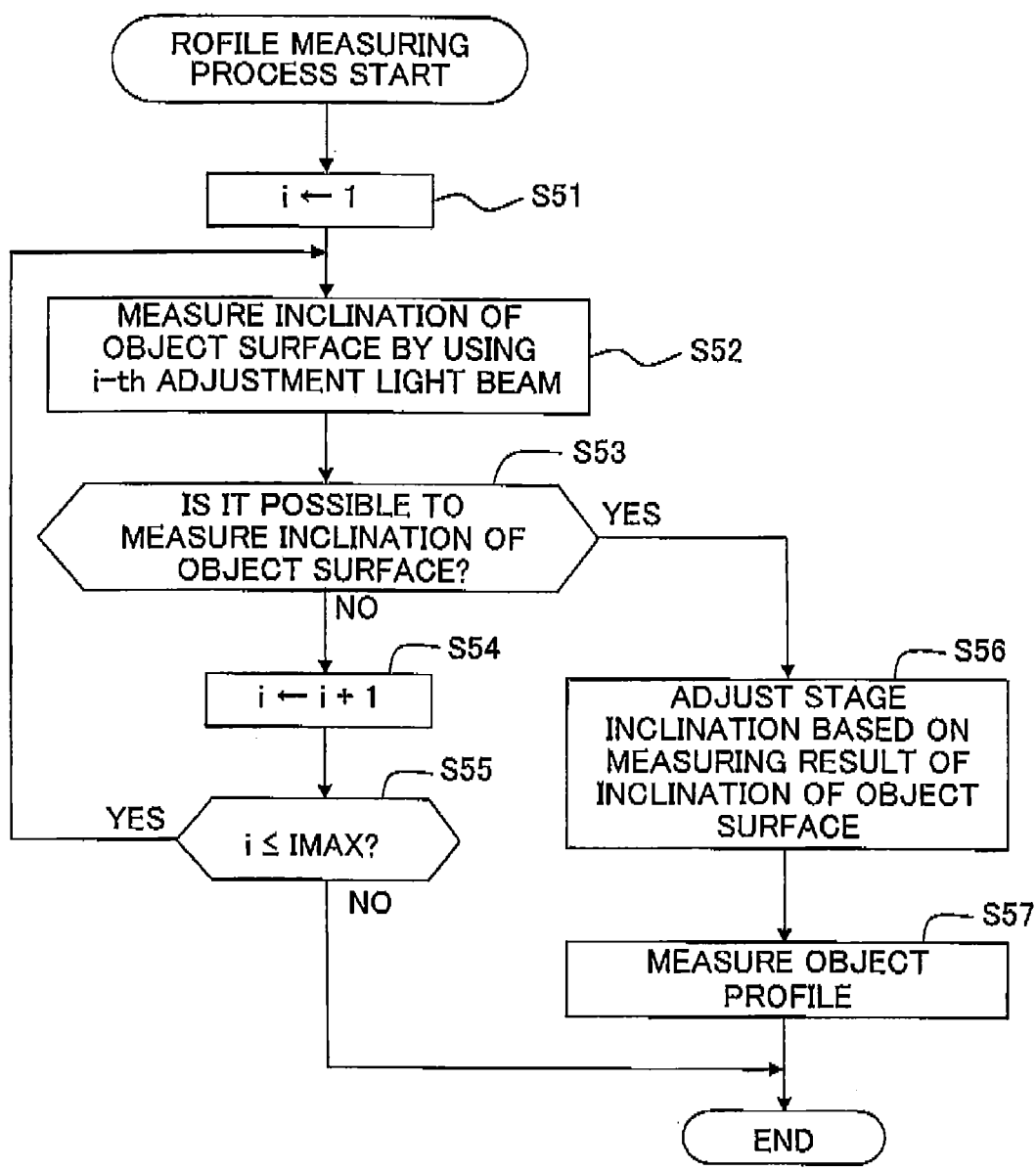
FIG. 5 is a flowchart for explaining a profile measuring process carried out in the second embodiment of the profile measuring apparatus in accordance with the present teaching.

FIG. 4 shows the positions at which adjustment light beams L1 to L5 emitted from the laser light sources 121-1 to 121-5 enter the illumination pupil PI of the illumination optical system (that is, the pupil of the objective lens 30 viewed from the incident side of the adjustment light beams L1 to L5). The adjustment light beam L1 enters the illumination pupil PI approximately at the center, and irradiates the object 2 from the same direction as the optical axis of the objective lens 30. On the other hand, the positions at which the adjustment light beams L2 to L5 enter the illumination pupil PI are arranged to be approximately 90 degrees apart from each other in the vicinity of the circumference of the illumination pupil PI. The adjustment light beams L2 to L5 irradiate the object 2 from different directions at a predetermined angle with respect to the optical axis of the objective lens 30, respectively.

The circle PL in the figure shows an example of the size of the pupil of the optical imaging system (that is, the pupil of the objective lens 30 viewed from the side of forming the image of the object 2), which will be described hereinafter.

Next, referring to the flowchart of FIG. 5, explanations will be made with respect to a profile measuring process carried out by the profile measuring apparatus 101. This process is, for example, started when the user inserts the Bertrand lens 31 into the optical path and inputs a command to adjust the inclination of the stage 19 to the control section 112 via the unshown operating unit.

In step S51, the inclination measuring unit 151 sets the value of variable "i" to be one.

In step S52, the profile measuring apparatus 101 measures the inclination of the object surface by using the i-th adjustment light beam. In particular, the inclination measuring unit 151 instructs the illumination control unit 152 to turn off the presently turned-on laser light source 121, i.e., the (i−1)-th laser light source 121, and turn on the i-th laser light source 121. Following this instruction, the illumination control unit 152 turns off the presently turned-on laser light source 121, and turns on the i-th laser light source 121. Then, through the same process as step S1 of FIG. 2, the inclination of the object surface is measured by utilizing the adjustment light beam emitted from the i-th laser light source 121.

In the present case, the first laser light source, namely the laser light source 121-1, is turned on, and the inclination of the object surface is measured by utilizing the adjustment light beam emitted from the laser light source 121-1.

In step S53, based on the processing result of step S52, the inclination measuring unit 151 determines whether or not the inclination of the object surface has been measured successfully. In particular, the inclination measuring unit 151 determines whether or not the CCD sensor 33 can detect any condensed or focused point of the light beam reflected by the object surface with the Bertrand lens 31 inserted in the optical path. Under a condition that no focused point can be detected when the object surface is illuminated by the adjustment light beam L1, then the object surface is a mirror plane and its inclination angle is not less than a half the aperture angle.

Here, the profile measuring apparatus 101 measures the inclination of the object surface by causing the adjustment light beam to be incident in a direction close to the normal direction of the object surface. When it is determined that the inclination of the object surface has not been measured successfully, then the process proceeds to step S54.

In step S54, the inclination measuring unit 151 increments the value of variable i by one.

In step S55, the inclination measuring unit 151 determines whether or not i≦IMAX. When i≦IMAX is determined, then the process returns to step S52. The value of IMAX is set to be the total number of the laser light sources 121. In the case of the profile measuring apparatus 101, the value of IMAX is set to be five.

Thereafter, the process from step S52 to step S55 is repeatedly carried out until either it is determined in step S53 that the inclination of the object surface has been measured successfully or i>IMAX is determined in step S55. That is, the inclination of the object surface is measured while switching over the turn-on laser light source 121 in sequence.

On the other hand, when it is determined in step S53 that the inclination of the object surface has been measured successfully, then the process proceeds to step S56.

Then, in step S56, in the same manner as the process of step S3 of FIG. 2, based on the measuring result of the inclination of the object surface, the inclination of the stage 14 is adjusted. In step S57, in the same manner as the process of step S4 of FIG. 2, the profile of the object 2 is measured. Then, the profile measuring process is ended.

On the other hand, if i>IMAX is determined in step S55, that is, when the inclination of the object surface cannot be measured no matter which laser light source 121 is utilized, then the profile measuring process is ended without carrying out the measuring of the profile of the object 2. Thereafter, for example after visually adjusting the inclination of the stage 14, the user may either measure the profile of the object 2 or carry out the process over again from step S51.

In this manner, it is possible to widen the range of the automatic adjustability of the inclination of the object surface. Especially, this is useful when the pupil PL of the optical imaging system is smaller than the illumination pupil PI of the illumination optical system as shown in FIG. 4 because, for example, the objective lens 30 is constructed by a plurality of lens groups, etc.

Further, in the above explanations, an example is shown of utilizing different laser light sources 121 such that the adjustment light beams enter the illumination pupil PI of the illumination optical system at different positions. However, it is also possible to utilize a diffraction grating, a light shielding plate and the like, for example, to alter the position at which the adjustment light beam from the same light source enters the illumination pupil PI.

In the above explanations, an example is shown of turning on the laser light sources 121 in sequence to measure the inclination of the object surface. However, the inclination of the object surface may be measured by, for example, turning on all laser light sources 121 at one time after setting a different wavelength for the adjustment light beam emitted from each laser light source 121 to allow for individual identification.

The number of the laser light sources 121 of the profile measuring apparatus 101 is just an example, and it can be set to be an arbitrary number.

Next, referring to FIGS. 6 to 8B, explanations will be made with respect to a third embodiment of a profile measuring apparatus in accordance with the present teaching.

Figure 6:
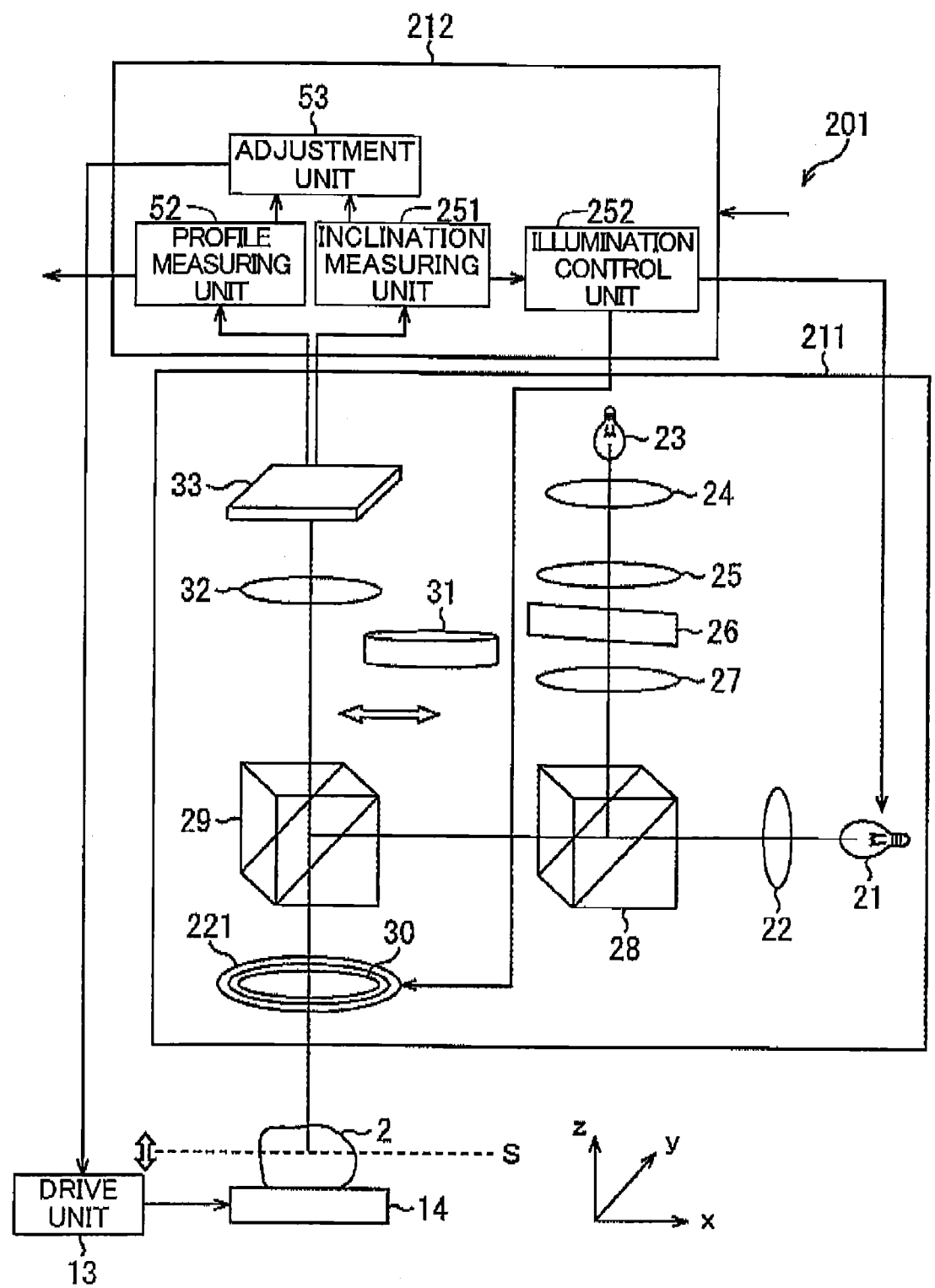
FIG. 6 is a block diagram showing a third embodiment of a profile measuring apparatus in accordance with the present teaching.

FIG. 6 is a block diagram showing the third embodiment of the profile measuring apparatus in accordance with the present teaching. Further, the components in FIG. 6 corresponding to those in FIG. 1 are designated by the same reference numerals.

Compared with the profile measuring apparatus 1 in FIG. 1, a profile measuring apparatus 201 in FIG. 6 is different in that a measuring section 211 is provided instead of the measuring section 11, and a control section 212 is provided instead of the control section 12.

Figure 7:
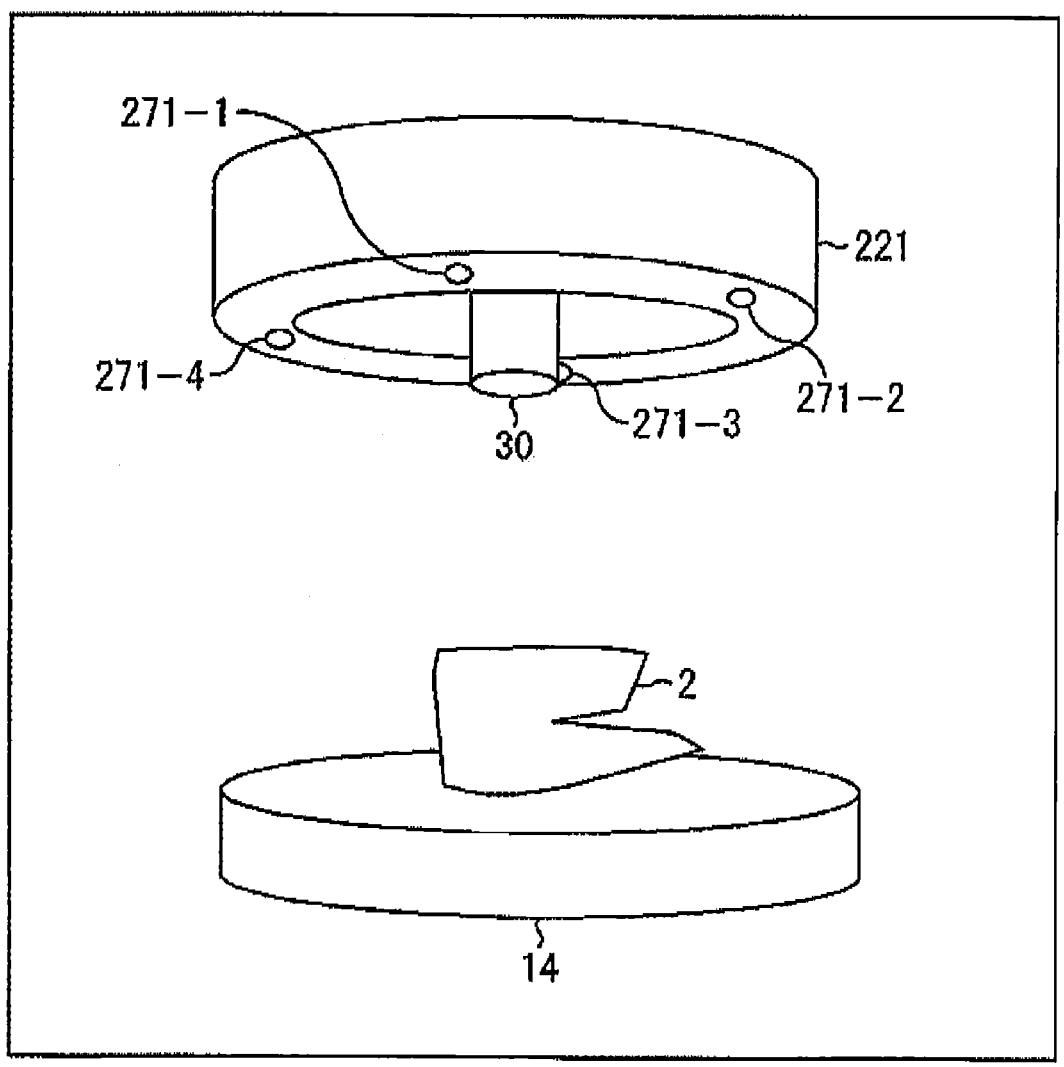
FIG. 7 shows an example of the position of installing an illumination device.

Compared with the measuring section 11 of the profile measuring apparatus 1, the measuring section 211 is different in that an illumination device 221 is provided. As shown in FIG. 7, the illumination device 221 has a tubular shape, and is provided to enclose the periphery of the objective lens 30. On the lower surface of the illumination device 221, for example, light sources 271-1 to 271-4 constructed by LEDs are provided to be 90 degrees apart from each other. The light sources 271-1 to 271-4 can be individually turned on or turned off, and light beams emitted by the light sources 271-1 to 271-9 (to be referred to as auxiliary light beams hereinbelow) irradiate the object 2 on the stage 19. When it is unnecessary to distinguish the light sources 271-1 to 271-4 individually, they will be collectively referred to as the light sources 271 hereinbelow.

Compared with the control section 12 of the profile measuring apparatus 1, the control section 212 is different in that an inclination measuring unit 251 is provided instead of the inclination measuring unit 51, and an illumination control unit 252 is additionally provided.

The inclination measuring unit 251 has the same function as the inclination measuring unit 51 of the profile measuring apparatus 1. Further, the inclination measuring unit 251 instructs the illumination control unit 252 to turn on and turn off the laser light source 21 and each light source 271 of the illumination device 221.

The illumination control unit 252 controls the operations of turning on and turning off the laser light source 21 and each light source 271 of the illumination device 221 in accordance with the instructions from the inclination measuring unit 251.

Figure 8A:
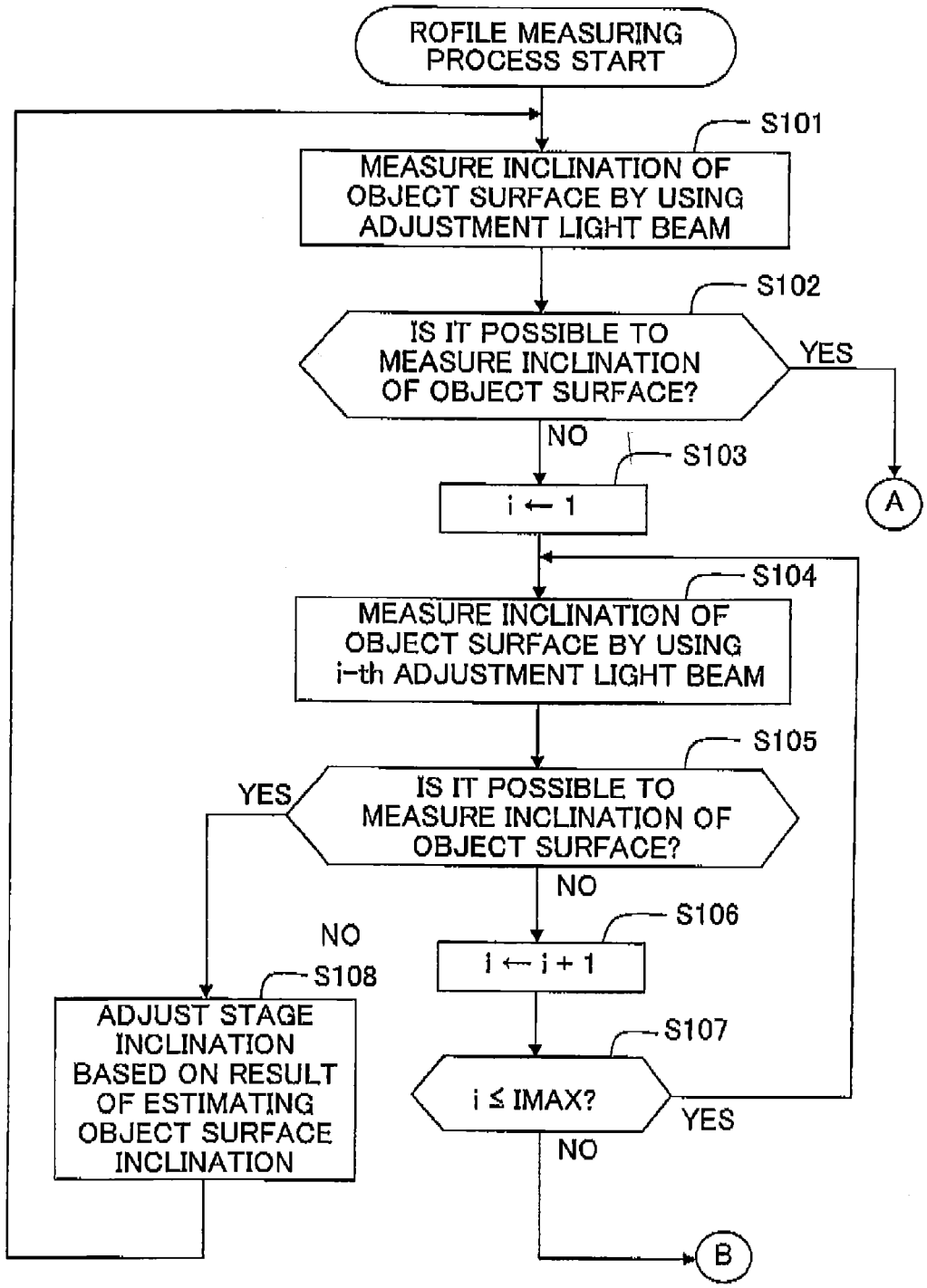

Next, referring to the flowcharts of FIGS. 8A and 8B, explanations will be made with respect to a profile measuring process carried out by the profile measuring apparatus 201. This process is, for example, started when the user inserts the Bertrand lens 31 into the optical path and inputs a command to adjust the inclination of the stage 14 to the control section 212 via the unshown operating unit.

In step S101, the profile measuring apparatus 201 measure the inclination of the object surface by utilizing the adjustment light beam. In particular, the inclination measuring unit 251 instructs the illumination control unit 252 to turn on the laser light source 21. Following this instruction, the illumination control unit 252 turns on the laser light source 21. Then, through the same process as step S1 of FIG. 2, the inclination of the object surface is measured by utilizing the adjustment light beam emitted from the laser light source 21.

In step S102, based on the processing result of step S101, the inclination measuring unit 251 determines whether or not the inclination of the object surface has been measured successfully. When it is determined that the inclination of the object surface has not been measured successfully, then the process proceeds to step S103.

In step S103, the inclination measuring unit 251 sets the value of variable i to be one.

In S104, the inclination measuring unit 251 utilizes the i-th auxiliary light beam to estimate the inclination of the object surface. In particular, the inclination measuring unit 251 instructs the illumination control unit 252 to turn on the i-th light source 271 of the illumination device 221. Following this instruction, the illumination control unit 252 turns on the i-th light source 271 of the illumination device 221.

The auxiliary light beam emitted from the i-th light source directly irradiates the object 2, is reflected by the surface of the object 2, transmitted through the objective lens 30 and the half prism 29, enters the Bertrand lens 31, and becomes a parallel light beam due to the Bertrand lens 31. Then, the parallel auxiliary light beam enters the imaging lens 32 to form an image on the light receiving surface of the CCD sensor 33. That is, the pupil image, at the imaging side of the objective lens 30 (the back focal plane; the exit pupil plane), of the object 2 on which the auxiliary light beam is projected is focused on the light receiving surface of the CCD sensor 33 by the Bertrand lens 31 and the imaging lens 32.

The CCD sensor 33 takes an image for the pupil image of the object 2 irradiated by the i-th auxiliary light beam (to be referred to as an auxiliary image hereinbelow) under the control of the inclination measuring unit 251 of the control section 212, and outputs the obtained auxiliary image to the inclination measuring unit 251. The inclination measuring unit 251 detects the barycentric position of the image of the auxiliary light beam in the auxiliary image, and estimates the inclination of the object surface based on the barycentric position.

In the present case, the first light source 271-1 is turned on, and the inclination of the object surface is estimated by utilizing the auxiliary light beam emitted from the light source 271-1.

Because the auxiliary light beam has a wider irradiation range compared with the adjustment light beam, the precision of estimating the inclination of the object surface by utilizing the auxiliary light beam is lower than the precision of measuring the inclination of the object surface by utilizing the adjustment light beam.

In step S105, based on the processing result of step S104, the inclination measuring unit 251 determines whether or not the inclination of the object surface has been estimated successfully. When it is determined that the inclination of the object surface has not been estimated successfully, then the process proceeds to step S106.

In step S106, the inclination measuring unit 251 increments the value of variable i by one.

In step S107, the inclination measuring unit 251 determines whether or not $i \leq IMAX$. When $i \leq IMAX$ is determined, then the process returns to step S104. Further, the value of IMAX is set to be the total number of the light sources 271 of the illumination device 221. In the case of the profile measuring apparatus 201, the value of IMAX is set to be four.

Thereafter, the process from step S104 to step S107 is repeatedly carried out until either it is determined in step S105 that the inclination of the object surface has been estimated successfully or i>IMAX is determined in step S107. That is, the inclination of the object surface is estimated while switching over the turn-on light source 271 in sequence.

On the other hand, when it is determined in step S105 that the inclination of the object surface has been estimated successfully, then the process proceeds to step S108.

In step S108, in the same manner as the process of step S3 of FIG. 2, the inclination of the stage 14 is adjusted based on the result of the estimation of the inclination of the object surface.

Thereafter, the process returns to step S101, where the inclination of the object 2 is measured again by utilizing the adjustment light beam. That is, as described above, the result of estimating the inclination of the object surface by utilizing the auxiliary light beam carries a greater error than the result of measuring the inclination of the object surface by utilizing the adjustment light beam. Therefore, the adjustment light beam is utilized again to adjust the inclination of the stage 14 after adjusting the inclination of the stage 14 by utilizing the auxiliary light beam.

Thereafter, the process from step S101 to step S108 is repeatedly carried out until either it is determined in step S102 that the inclination of the object surface has been measured successfully or i>IMAX is determined in step S107.

On the other hand, when it is determined in step S102 that the inclination of the object surface has been measured successfully, then the process proceeds to step S109.

In step S109, in the same manner as the process of step S3 of FIG. 2, the inclination of the stage 14 is adjusted based on the result of measuring the inclination of the object surface. In step S110, in the same manner as the process of step S4 of FIG. 2, the profile of the object 2 is measured. Then, the profile measuring process is ended.

On the other hand, when i>IMAX is determined in step S107, that is, when the inclination of the object surface cannot be estimated no matter which light source 271 of the illumination device 221 is utilized, then the profile measuring process is ended without carrying out the measuring of the profile of the object 2. Thereafter, for example after visually adjusting the inclination of the stage 14, the user may either measure the profile of the object 2 or carry out the process over again from step S101.

In this manner, it is possible to widen the range of the automatic adjustability of the inclination of the object surface.

Further, in the above explanations, an example is shown of turning on the light sources 271 of the illumination device 221 in sequence to estimate the inclination of the object surface. However, the inclination of the object surface may be estimated by, for example, turning on all light sources 271 at one time after setting a different wavelength for the auxiliary light beam emitted from each light source 271 to allow for respective identification.

Next, referring to FIG. 9, explanations will be made with respect to a fourth embodiment of a profile measuring apparatus in accordance with the present teaching.

Figure 9:
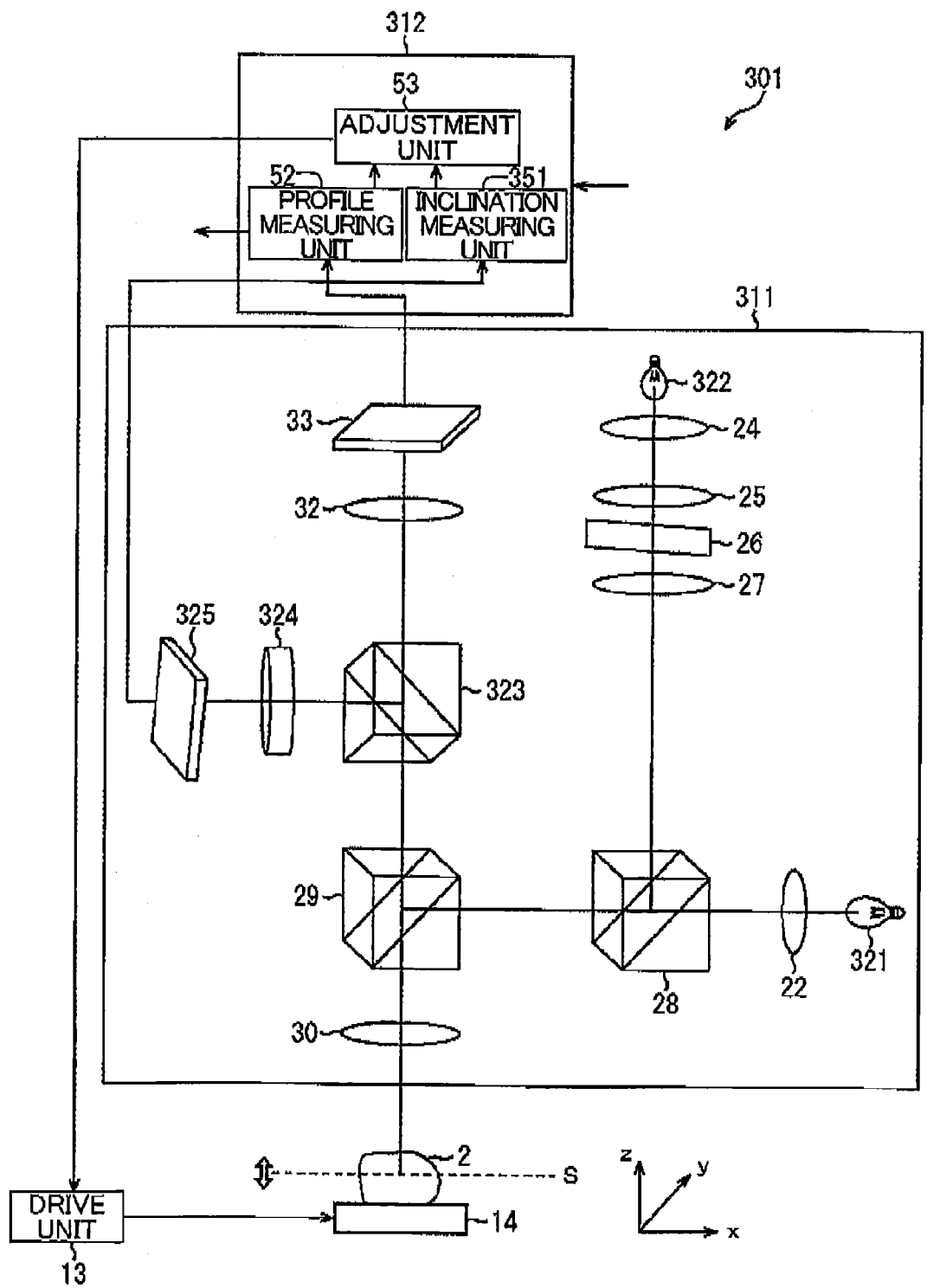
FIG. 9 is a block diagram showing a fourth embodiment of a profile measuring apparatus in accordance with the present teaching.
Figure 10:
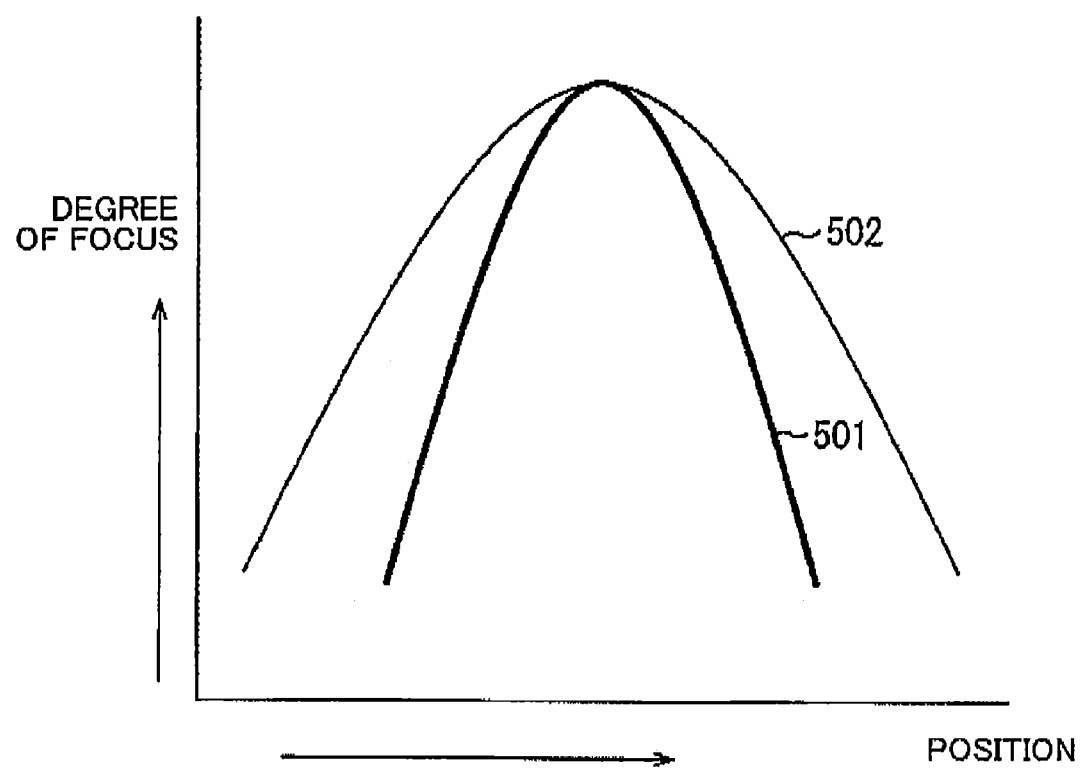
FIG. 10 is a graph showing a relationship of change between the NA of an optical imaging system and the degree of focus.

FIG. 9 is a block diagram showing the fourth embodiment of the profile measuring apparatus in accordance with the present teaching. Further, the components in FIG. 9 corresponding to those in FIG. 1 are designated by the same reference numerals.

Compared with the profile measuring apparatus 1 in FIG. 1, a profile measuring apparatus 301 in FIG. 9 is different in that a measuring section 311 is provided instead of the measuring section 11, and a control section 312 is provided instead of the control section 12.

Compared with the measuring section 11 of the profile measuring apparatus 1, the measuring section 311 is different in that a laser light source 321 is provided instead of the laser light source 21, and a light source 322 is provided instead of the light source 23. Further, compared with the measuring section 11, the measuring section 311 is also different in that a dichroic mirror 323, a pupil imaging lens 324 and a CCD sensor 325 are newly provided, whereas the Bertrand lens 31 is not provided.

Further, compared with the control section 12 of the profile measuring apparatus 1, the control section 312 is different in that an inclination measuring unit 351 is provided instead of the inclination measuring unit 51.

The laser light source 321 and the light source 322 are set to emit light beams of different wavelengths, respectively. For example, when the adjustment light beam emitted from the laser light source 321 has a wavelength of 680 nm, the measuring light beam emitted from the light source 322 is set to have a wavelength between 450 nm and 660 nm; when the adjustment light beam emitted from the laser light source 321 has a wavelength of 900 nm, the measuring light beam emitted from the light source 322 is set to have a wavelength between 450 nm and 700 nm.

Further, the dichroic mirror 323 has a property of reflecting light beams of the same wavelength as the adjustment light beam and transmitting those of other wavelengths therethrough.

Therefore, the adjustment light beam emitted from the laser light source 321 is transmitted through the collector lens 22 and the half prism 28, reflected by the half prism 29 in the direction to the objective lens 30, and condensed on the pupil plane of the objective lens 30 at the image side. Then, the adjustment light beam condensed on the pupil plane of the objective lens 30 at the image side enters the objective lens 30, becomes a parallel light beam due to the objective lens 30, and irradiates the object 2 from the same direction as the optical axis of the objective lens 30.

The adjustment light beam irradiating the object 2 is reflected by the surface of the object 2 (namely the object surface), transmitted through the objective lens 30 and the half prism 29, and reflected in the direction to the pupil imaging lens 324 due to the dichroic mirror 323. Then, the pupil image of the object 2, at the imaging side of the objective lens 30 (the back focal plane; the exit pupil plane), on which the adjustment light beam is projected is focused on the light receiving surface of the CCD sensor 325 by the pupil imaging lens 324.

The CCD sensor 325 takes an image for the pupil image of the object 2 irradiated by the adjustment light beam (the adjustment image) under the control of the inclination measuring unit 351 of the control section 312, and outputs the obtained adjustment image to the inclination measuring unit 351.

On the other hand, the measuring light beam emitted from the light source 322 becomes a parallel light beam due to the condenser lens 24, is condensed on a plane image-conjugate to the focal plane S of the measuring light beam irradiating the object 2 due to the relay lens 25, and enters the projection pattern plate 26 arranged on the plane image-conjugate to the focal plane S. The measuring light beam transmitted through the projection pattern plate 26 becomes a pattern light beam having a pattern of the same shape as the pattern of the projection pattern plate 26. Then, the measuring light beam becomes a parallel light beam due to the relay lens 27, is reflected by the half prism 28 and the half prism 29 in the direction to the objective lens 30, and enters the objective lens 30. The objective lens 30 forms an image of the pattern light beam on the focal plane S, and projects the image of the pattern formed in the projection pattern plate 26 onto the object 2.

The pattern light beam irradiating the object 2 is reflected by the surface of the object 2, transmitted through the objective lens 30, the half prism 29 and the dichroic mirror 323, and enters the imaging lens 32. Then, the imaging lens 32 forms an image of the object 2, on which the pattern image is projected by the pattern light beam, on the light receiving surface of the CCD sensor 33.

The CCD sensor 33 takes an image of the object 2 on which the pattern image is projected (an observational image) under the control of the profile measuring unit 52 of the control section 312, and outputs the obtained observational image to the profile measuring unit 52.

In this manner, the profile measuring apparatus 301 is provided with an optical imaging system configured to take adjustment images and an optical imaging system configured to take observational images, separately. Thereby, it is possible to take an adjustment image and an observational image at the same time. Hence, it is possible to measure the profile of the object 2 at the same time as adjusting the inclination of the stage 14 by utilizing the adjustment image. For example, it is possible to measure the profile of the object 2 while adjusting the inclination of the stage 14 instantaneously along with the movement of the stage 14 in the z-axis direction.

It is possible to combine the second and third embodiments in accordance with the present teaching. Furthermore, it is also possible to combine the second and fourth embodiments, the third and fourth embodiments, or the second, third and fourth embodiments, in accordance with the present teaching.

Further, in the above explanations, an example is shown of automatically adjusting the inclination of the stage 14 based on the result of measuring the inclination angle of the object surface. However, the user may manually adjust the inclination of the stage 14 while referring to the result of measuring the inclination angle of the object surface, for example, so that the inclination angle becomes zero degree.

Further, when the inclination angle of the object surface exceeds a predetermined threshold value, then the user may determine that the reliability for the degree of focus is low, and thus remove that result from the measurement data without carrying out the adjustment of the inclination of the stage 14.

Further, embodiments of the present teaching are not limited to those described hereinabove but allowed to undergo various changes without departing from the spirit and scope of the present teaching.

Figure 11:
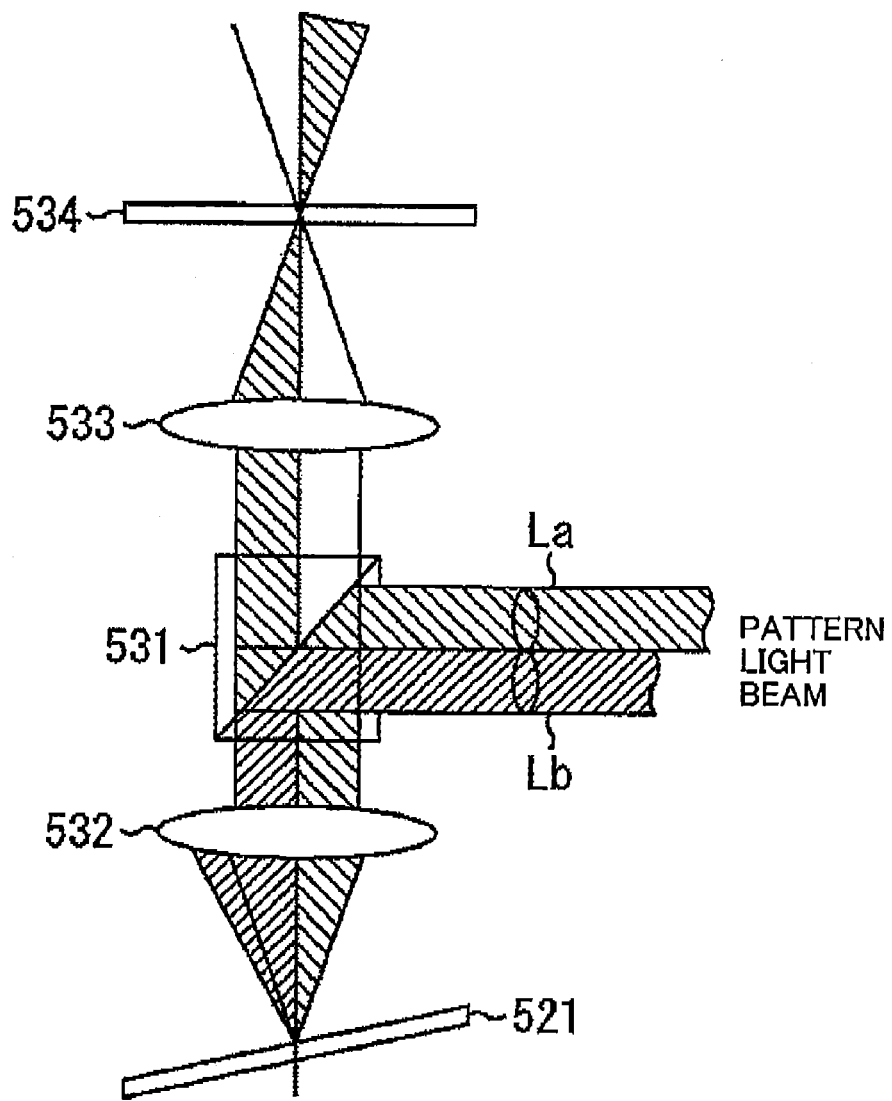
FIG. 11 is a pattern diagram of an optical system of a conventional profile measuring apparatus.

Hereinbelow, an object of the present teaching will be explained. When the surface of an object is a mirror plane and (the normal of) the surface is inclined with respect to the optical axis of the optical imaging system, then part of the reflected light beam reflected by the surface of the object does not enter the optical imaging system, thereby restricting the substantial NA of the optical imaging system. Referring to FIG. 11, a detailed explanation will be made in this respect.

FIG. 11 is a pattern diagram of an optical system of a conventional profile measuring apparatus utilizing the shape from focus method. In the optical system of FIG. 11, a pattern light beam emitted from an unshown light source is reflected by a half prism 531 in the direction to an objective lens 532, and projected on an object 521 to be measured through the objective lens 532. The pattern light beam reflected by the object 521 is transmitted through the objective lens 532 and the half prism 531, and enters an imaging lens 533. Then, the imaging lens 533 forms an image of the object 521 with the projected image of the pattern light beam (the pattern image) on the light receiving surface of a CCD sensor 534, and the CCD sensor 534 takes an observational image.

At this time, according to FIG. 11, the surface of the object 521 is inclined with respect to the optical axis of the objective lens 532 by half the angle of aperture of the light beam exiting the objective lens 532. Therefore, in the figure of the pattern light beam entering the half prism 531 from the light source, with respect to the upper-half light beam La and the lower-half light beam Lb, the light beam Lb is "kicked out" at the objective lens 532, and thereby does not enter the CCD sensor 534.

That is, the light beam La falls on the surface of the object 521 from the objective lens 532, and after reflected by the surface, it enters the CCD sensor 534 via the objective lens 532 through the imaging lens 533. On the other hand, the light beam Lb falls on the surface of the object 521 from the objective lens 532, and after reflected by the surface, it does not enter the entrance pupil of the objective lens 532, and thus does not enter the half prism 531. Therefore, the pattern light beam projected on the object 521 loses the part of the light beam Lb.

Because of this, it can be prevented that the substantial NA of the optical imaging system becomes smaller, thereby it can be prevented a decrease in the precision of measuring the profile of the object 521.

In view of such kind of situation, an object of the present teaching is to make it possible to improve the precision of measuring the profile of an object. However, this object is just an example and the object of the present teaching is not limited to this.

What is claimed is:

1. A profile measuring apparatus which measures a profile of an object, comprising;
   an imaging element which is configured to take an image of the object on which a pattern is projected;
   an image formation optical system which is arranged to form an image of the pattern, projected on the object, on the imaging element and which includes an objective lens that condenses a light flux from the object on which the pattern is projected;
   a measuring direction changing unit which is configured to change inclination of a surface of the object with respect to the objective lens based on information of the inclination of the surface of the object so that a light flux from a point of the object, reaching the imaging element through the objective lens, enters the objective lens with an aperture angle not less than a predetermined degree; and,
   a measuring unit which is connected to the imaging element and measures the profile of the object based on the image, of the object on which the pattern is projected, obtained by the imaging element.

2. The profile measuring apparatus according to claim 1, wherein the measuring unit measures the profile of the object by acquiring degree of focus based on an image signal of the image of the pattern from the imaging element in a state that the measuring direction changing unit has caused the light flux reaching the imaging element through the objective lens to have the aperture angle not less than the predetermined degree.

3. The profile measuring apparatus according to claim 1, further comprising a projection optical system which is configured to project the pattern through the objective lens.

4. The profile measuring apparatus according to claim 1, further comprising an inclination information acquisition mechanism which is connected to the measuring direction changing unit, and which includes: an illumination optical system configured to irradiate the surface of the object with a parallel light flux from a predetermined direction; a convergence optical system configured to converge a reflected light flux of the parallel light flux from the surface of the object; and an inclination information acquisition unit configured to acquire inclination of the surface of the object with respect to an optical axis of the objective lens based on a converged light spot position of the parallel light flux converged by the convergence optical system.

5. The profile measuring apparatus according to claim 4, wherein the illumination optical system has a light source provided at a position of a pupil of the projection optical system or at a position conjugate to the position of the pupil, and the objective lens; and the inclination information acquisition unit has a pupil image taking unit provided at a position of a pupil of the image formation optical system or at a position conjugate to the position of the pupil, and an inclination information calculation unit which is connected to the pupil image taking unit and which is configured to calculate the inclination of the surface of the object with respect to the optical axis of the objective lens based on the converged light spot position obtained by the pupil image taking unit.

6. A profile measuring apparatus which measures a profile of an object, comprising:

a projection optical system which is configured to project an image of a pattern onto the object;

an imaging unit which is arranged to be connected optically with the projection optical system and which is configured to take a first image that is an image of the object on which the image of the pattern is projected;

an illumination optical system which is arranged to be connected optically with the imaging unit and which is configured to irradiate the object with a parallel light flux from a predetermined direction;

a pupil image formation unit which is arranged to be connected optically with the projection optical system and which is configured to form a pupil image of the object in a pupil of an optical imaging system provided in the imaging unit;

a pupil image taking unit which is arranged to be connected optically with the projection optical system and which is configured to take, as a second image, the pupil image of the object formed by the pupil image formation unit;

an inclination measuring unit which is connected to the pupil image taking unit and which is configured to measure inclination of a surface of the object based on the second image taken by the pupil image taking unit; and a measuring unit which is connected to the imaging element and which is configured to measure the profile of the object by a shape from focus method utilizing the first image taken from the imaging unit.

7. The profile measuring apparatus according to claim 6, wherein the pupil image formation unit has an imaging lens, and a Bertrand lens arranged to be insertable into and removable from an optical path of the optical imaging system between an objective lens and the imaging lens included in the optical imaging system, and the pupil image taking unit is constructed of the imaging unit.

8. The profile measuring apparatus according to claim 6, wherein the pupil image formation unit and the pupil image taking unit are provided separately from the imaging unit.

9. The profile measuring apparatus according to claim 6, wherein the illumination optical system is configured to cause the parallel light flux to enter an illumination pupil of the illumination optical system at different positions so as to allow the parallel light flux to irradiate the object from a plurality of different directions.

10. The profile measuring apparatus according to claim 6, further comprising an illumination member which is arranged to irradiate the object with an illumination light beam from the periphery of the objective lens, wherein the parallel light flux irradiates the object through the objective lens; and under a condition that the inclination of the surface of the object is not measurable by utilizing the second image, the inclination measuring unit estimates the inclination of the surface of the object based on a position of an image of the illumination light beam in a third image which is an image taken for the pupil image of the object irradiated by the illumination light beam.

11. The profile measuring apparatus according to claim 6 further comprising an adjustment unit which is connected to the inclination measuring unit and which is configured to adjust inclination of a stage on which the object is placed so that the surface of the object becomes vertical to an optical axis of the optical imaging system based on the inclination of the surface of the object.

12. A method for measuring a profile of an object by projecting a pattern onto a surface of the object, the method comprising:

acquiring inclination information of the surface of the object;

changing inclination of the surface of the object with respect to an objective lens of an image formation optical system based on the inclination information of the surface of the object so that under a condition that a light flux of the pattern projected on a position of the object entering the objective lens, and reaching an imaging element through the objective lens has an aperture angle with a predetermined angular width; and measuring the profile of the object by acquiring degree of focus for an image of the object at each of the different points obtained by the image formation optical system.

13. A method for manufacturing a product comprising:

forming an profile of an object to be a product by processing the object; and measuring the formed profile of the object by the profile measuring method as defined in claim 12.

* * * * *

UNITED STATES PATENT AND TRADEMARK OFFICE
CERTIFICATE OF CORRECTION

PATENT NO. : 8,441,652 B2
APPLICATION NO. : 13/304658
DATED : May 14, 2013
INVENTOR(S) : Tomoaki Yamada It is certified that error appears in the above-identified patent and that said Letters Patent is hereby corrected as shown below:

In the Claims:

Column 14, Line 22, In Claim 1, delete "comprising;" and insert -- comprising: --, therefor.

Signed and Sealed this
Twenty-seventh Day of August, 2013

Teresa Stanek Rea
*Acting Director of the United States Patent and Trademark Office*